US011279360B2

(12) United States Patent
Fukuda et al.

(10) Patent No.: US 11,279,360 B2
(45) Date of Patent: Mar. 22, 2022

(54) AUTONOMOUS DRIVING SYSTEM (71) Applicant: Toyota Jidosha Kabushiki Kaisha, Toyota (JP)

(72) Inventors: Hiroki Fukuda, Shizuoka-ken (JP); Shota Fujii, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 282 days.

(21) Appl. No.: 16/502,581

(22) Filed: Jul. 3, 2019

(65) Prior Publication Data
US 2020/0070835 A1 Mar. 5, 2020

(30) Foreign Application Priority Data

Aug. 28, 2018 (JP) .............................. JP2018-159429

(51) Int. Cl.
*B60W 30/18* (2012.01)
*B60W 30/095* (2012.01)
*G06K 9/00* (2006.01)

(52) U.S. Cl.
CPC .. *B60W 30/18163* (2013.01); *B60W 30/0956* (2013.01); *G06K 9/00805* (2013.01); *G06K 9/00825* (2013.01); *B60W 2554/4041* (2020.02); *B60W 2554/801* (2020.02); *B60W 2554/804* (2020.02)

(58) Field of Classification Search
CPC ... B60W 2554/4041; B60W 2554/801; B60W 2554/804; B60W 30/0956; B60W 30/18163; B60W 60/001; G06K 9/00805; G06K 9/00825

See application file for complete search history.

(56) References Cited

U.S. PATENT DOCUMENTS 8,457,827 B1* 6/2013 Ferguson ............ B60W 30/095
701/23
10,266,180 B1* 4/2019 Fields ................ B60W 50/0205
2014/0032017 A1* 1/2014 Anderson ................ G05D 1/00
701/3

(Continued)

FOREIGN PATENT DOCUMENTS

JP 2017033060 A 2/2017
JP 2018-092484 A 6/2018

*Primary Examiner* — Babar Sarwar
(74) *Attorney, Agent, or Firm* — Dinsmore & Shohl LLP (57) ABSTRACT

An autonomous driving system includes an information acquiring device configured to acquire driving environment information and a travelling control device configured to execute lane change control from a first lane to a second lane during autonomous driving based on the driving environment information. The travelling control device is configured to perform a continuation determining process of determining whether to continue the lane change control based on a combination of a progress level and an influence level when a subsequent vehicle in the second lane is detected based on the driving environment information and a stop request for execution of the lane change control is detected after execution of the lane change control has started. The progress level represents progress of the lane change control and the influence level represents a predicted degree of influence of continuing the lane change control on the subsequent vehicle.

5 Claims, 5 Drawing Sheets

(56) References Cited

U.S. PATENT DOCUMENTS

| | | | |
|---|---|---|---|
| 2015/0151725 A1* | 6/2015 | Clarke | B60W 10/18 |
| | | | 701/28 |
| 2016/0091896 A1* | 3/2016 | Maruyama | B60W 50/10 |
| | | | 701/23 |
| 2018/0157257 A1 | 6/2018 | Hashimoto et al. | |
| 2018/0345978 A1* | 12/2018 | Fujii | B62D 15/0255 |
| 2018/0346026 A1* | 12/2018 | Fujii | B60W 30/09 |
| 2019/0004513 A1* | 1/2019 | Chiba | B60T 8/17 |
| 2019/0061765 A1* | 2/2019 | Marden | B60W 30/18163 |
| 2019/0084572 A1* | 3/2019 | Oishi | B60W 10/00 |
| 2019/0143982 A1* | 5/2019 | Hashimoto | B60W 50/10 |
| | | | 701/23 |
| 2019/0143983 A1* | 5/2019 | Hashimoto | G05D 1/0088 |
| | | | 701/23 |
| 2019/0250617 A1* | 8/2019 | Ford | B60W 50/0097 |
| 2020/0003563 A1* | 1/2020 | Miyake | G01C 21/3407 |
| 2020/0089180 A1* | 3/2020 | Kanekawa | G05B 19/0425 |

\* cited by examiner

| INFLUENCE LEVEL | TYPE OF STOP REQUEST |
|---|---|
| Lv. 1 | DETERMINATION OF STOP BY SYSTEM MAP-BASED RESTRICTION |
| Lv. 2 | FAILURE OF SYSTEM STOP OPERATION BY DRIVER |
| Lv. 3 | APPROACH OF FOLLOWING VEHICLE |

FIG. 6

| | | INFLUENCE LEVEL | |
|---|---|---|---|
| | | Lv.1 | Lv.2 |
| PROGRESS LEVEL | Lv. 1 | CONTINUATION | CONTINUATION |
| | Lv. 2 | STOP | CONTINUATION |
| | Lv. 3 | STOP | STOP |

AUTONOMOUS DRIVING SYSTEM

CROSS-REFERENCE TO RELATED APPLICATION

This application claims priority to Japanese Patent Application No. 2018-159429 filed on Aug. 28, 2018, incorporated herein by reference in its entirety.

BACKGROUND

1. Technical Field

The disclosure relates to an autonomous driving system.

2. Description of Related Art

Japanese Unexamined Patent Application Publication No. 2017-033060 (JP 2017-033060 A) discloses a driving support device that autonomously executes lane change control from a first lane to a second lane. When an object with which collision should be avoided is not detected in the second lane, this device starts execution of lane change control. When a position of at least one object which is present in the second lane is detected after lane change control has started, the device stops execution of lane change control.

SUMMARY

An example of the at least one object is a vehicle in the second lane. There may be cases where it is not very necessary to stop execution of lane change control even when such a vehicle is present. In such cases, stopping execution of lane change control without exception may cause confusion among neighboring vehicles. Particularly, it is predicted that a subsequent vehicle (or a driver thereof) in the second lane recognizes a vehicle which is entering the front thereof. Accordingly, when execution of lane change control is stopped halfway, the subsequent vehicle may be confused.

The disclosure provides a technique of preventing a subsequent vehicle in a second lane from being confused due to stopping of execution of lane change control from a first lane to the second lane.

According to a first aspect of the disclosure, there is provided an autonomous driving system which is mounted in a vehicle. The autonomous driving system includes an information acquiring device and a travelling control device. The information acquiring device is configured to acquire driving environment information indicating a driving environment of the vehicle. The travelling control device is configured to execute lane change control from a first lane to a second lane while the vehicle is being autonomously driven based on the driving environment information. The travelling control device is configured to detect a subsequent vehicle in the second lane based on the driving environment information. The travelling control device is configured to perform a continuation determining process of determining whether to control the lane change control based on a combination of a progress level and an influence level when a subsequent vehicle in the second lane is detected based on the driving environment information and a stop request for execution of the lane change control is detected after execution of the lane change control has started. The progress level represents progress of the lane change control. The influence level represents a predicted degree of influence of continuation of the lane change control on the subsequent vehicle. The influence level is set in advance depending on a type of the stop request.

According to the first aspect, the continuation determining process is performed based on a combination of the influence level which is set in advance depending on the type of the stop request and the progress level. Accordingly, it is possible to prevent a subsequent vehicle from being confused due to stopping of execution of the lane change control.

In the first aspect, the travelling control device may be configured to perform a progress level determining process in the continuation determining process. The progress level determining process may be a process of determining the progress level. In the progress level determining process, the travelling control device may be configured to determine that the progress level is a first progress level when a relative position of the vehicle with respect to a reference line between the first lane and the second lane is on the first lane side, and to determine that the progress level is a second progress level when the relative position is on the second lane side. In the continuation determining process, the travelling control device may be configured to determine not to continue the lane change control regardless of the progress level when the influence level is a third influence level, and to determine to continue the lane change control regardless of the progress level when the influence level is a first influence level. In the continuation determining process, the travelling control device may be configured to determine not to control the lane change control when the influence level is a second influence level and it is determined that the progress level is the first progress level, and to determine to continue the lane change control when the influence level is the second progress level and it is determined that the progress level is the second progress level. The first influence level may be lower than the second influence level, and the second influence level may be lower than the third influence level.

According to this configuration, the continuation determining process is performed based on a combination of the progress level which is determined based on the relative position of the vehicle with respect to the reference line and the influence level. Accordingly, it is possible to appropriately prevent a subsequent vehicle from being confused due to stopping of execution of the lane change control.

In the first aspect, the travelling control device may be configured to perform a progress level determining process in the continuation determining process. The progress level determining process may be a process of determining the progress level. In the progress level determining process, the travelling control device may be configured to determine that the progress level is a first progress level when an elapsed time after execution of the lane change control has started is less than a threshold value, and to determine that the progress level is a second progress level when the elapsed time is greater than the threshold value. The travelling control device may be configured to determine not to continue the lane change control regardless of the progress level when the influence level is a third influence level, and to determine to continue the lane change control regardless of the progress level when the influence level is a first influence level. In the continuation determining process, the travelling control device may be configured to determine not to continue the lane change control when the influence level is a second influence level and it is determined that the progress level is the first progress level, and to determine to continue the lane change control when the influence level is the second progress level and it is determined that the progress level is the second progress level. The first influence level may be lower than the second influence level, and the second influence level may be lower than the third influence level.

According to this configuration, the continuation determining process is performed based on a combination of the progress level which is determined based on the elapsed time after execution of the lane change control has started and the influence level. Accordingly, it is possible to appropriately prevent a subsequent vehicle from being confused due to stopping of execution of the lane change control.

In the first aspect, the travelling control device may be configured to perform a progress level determining process in the continuation determining process. The progress level determining process may be a process of determining the progress level. In the progress level determining process, the travelling control device may be configured to determine that the progress level is a first progress level when a travelling distance of the vehicle after execution of the lane change control has started is less than a threshold value, and to determine that the progress level is a second progress level when the travelling distance is greater than the threshold value. In the continuation determining process, the travelling control device may be configured to determine not to continue the lane change control regardless of the progress level when the influence level is a third influence level, and to determine to continue the lane change control regardless of the progress level when the influence level is a first influence level. In the continuation determining process, the travelling control device may be configured to determine not to continue the lane change control when the influence level is a second influence level and it is determined that the progress level is the first progress level, and to determine to continue the lane change control when the influence level is the second influence level and it is determined that the progress level is the second progress level. The first influence level may be lower than the second influence level, and the second influence level may be lower than the third influence level.

According to this configuration, the continuation determining process is performed based on a combination of the progress level which is determined based on the travelling distance after execution of the lane change control has started and the influence level. Accordingly, it is possible to appropriately prevent a subsequent vehicle from being confused due to stopping of execution of the lane change control.

In the first aspect, the travelling control device may be configured to perform a progress level determining process of determining the progress level in the continuation determining process. In the progress level determining process, the travelling control device may be configured to determine that the progress level is a first progress level when a relative position of the vehicle with respect to a reference line between the first lane and the second lane is on the first lane side, and configured to determine that the progress level is a second progress level when the relative position is on the second lane side. In the continuation determining process, the travelling control device may be configured to determine whether to continue the lane change control based on the progress level when the influence level is a first influence level, and configured to determine whether to continue the lane change control based on the influence level when the influence level is a second influence level.

In the first aspect, the influence level may include a first influence level and a second influence level, and a predicted degree of influence on the subsequent vehicle at the second influence level may be higher than that at the first influence level.

In the first aspect, the influence level may include a second influence level and a third influence level, and a predicted degree of influence on the subsequent vehicle at the second influence level may be lower than that at the third influence level.

BRIEF DESCRIPTION OF THE DRAWINGS

WWI Features, advantages, and technical and industrial significance of exemplary embodiments of the disclosure will be described below with reference to the accompanying drawings, in which like numerals denote like elements, and wherein.

DETAILED DESCRIPTION

Hereinafter, an embodiment of the disclosure will be described with reference to the accompanying drawings. When numerical values, such as the number of each element, and the quantity, amount, and range of each element, are mentioned in the following embodiment, the disclosure is not limited to the mentioned numerical values unless mentioned explicitly or unless the numerical values are clearly restrictive in principle. Structures, steps, or the like which will be described in the following embodiment are not essential for the disclosure unless mentioned explicitly or unless the numerical values are apparently restrictive in principle.

1. Entire Configuration of Autonomous Driving System

Figure 1:
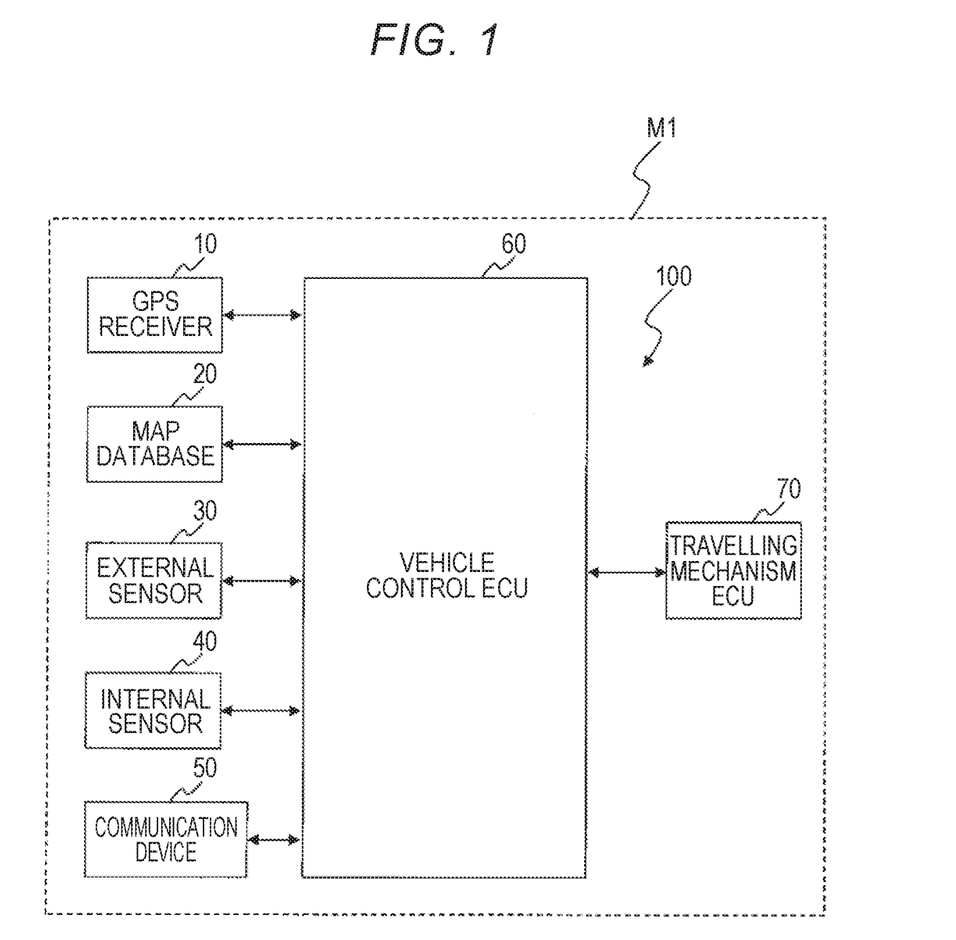
FIG. 1 is a block diagram illustrating an example of the configuration of an autonomous driving system according to an embodiment of the disclosure.

FIG. 1 is a block diagram illustrating an example of the configuration of an autonomous driving system 100 according to an embodiment of the disclosure. This system is mounted in a vehicle and controls autonomous driving of the vehicle. A vehicle in which this system is mounted (hereinafter also referred to as a "vehicle M1") is, for example, a vehicle using an internal combustion engine such as a diesel engine or a gasoline engine as a power source, an electric vehicle using an electric motor as a power source, or a hybrid vehicle including an internal combustion engine and an electric motor. The electric motor is driven by a battery such as a secondary battery, a hydrogen fuel cell, a metal fuel cell, or an alcohol fuel cell.

The autonomous driving system 100 illustrated in FIG. 1 includes a Global Positioning System (GPS) receiver 10, a map database 20, an external sensor 30, an internal sensor 40, a communication device 50, a vehicle control electronic control unit (hereinafter also referred to as a "vehicle control ECU") 60, and a travelling mechanism electronic control unit (hereinafter also referred to as a "travelling mechanism ECU") 70.

The GPS receiver 10 is a device that receives signals from three or more GPS satellites. The GPS receiver 10 calculates a position and orientation (a direction) of the vehicle M1 based on the received signals. The GPS receiver 10 transmits the calculated information (hereinafter also referred to as "position and orientation information") to the vehicle control ECU 60.

Data of map information are stored in the map database 20. The data of map information includes data of positions such as roads, intersections, merging junctions, and branching junctions, data of road shapes (for example, a curve, a type of a straight line, a road width, a road gradient, and a curvature of a curve), data of road types (for example, an expressway, a toll road, and a national highway), and data of boundary positions of each lane (a boundary position is expressed, for example, by a set of a plurality of points or a plurality of lines). The map database 20 is stored in a predetermined storage device (such as a hard disk or a flash memory).

The external sensor 30 is a device that detects conditions around the vehicle M1. Examples of the external sensor 30 include a laser imaging, detection and ranging (LIDAR), a radar, a camera, and a luminance sensor. The LIDAR detects an object around the vehicle M1 using light. The radar detects an object around the vehicle M1 using radio-waves. The camera images the conditions around the vehicle M1. The luminance sensor detects the luminance at the position of the vehicle M1. The external sensor 30 transmits the detected information (hereinafter also referred to as "external sensor information") to the vehicle control ECU 60.

The internal sensor 40 is a device that detects a travelling state of the vehicle M1. Examples of the internal sensor 40 include a vehicle speed sensor, a brake sensor, an accelerator operation sensor, a steering angle sensor, and an indicator sensor. The vehicle speed sensor detects a travelling speed of the vehicle M1. The brake sensor detects an amount of depression of a brake pedal by a driver. The accelerator operation sensor detects an amount of depression of an accelerator pedal by a driver. The steering angle sensor detects a rotation angle (a steering angle) of a steering wheel. The indicator sensor detects an operation direction of an indicator lever by a driver. The internal sensor 40 transmits the detected information (hereinafter also referred to as "internal sensor information") to the vehicle control ECU 60.

The communication device 50 performs V2X communication (vehicle-to-vehicle communication and road-to-vehicle communication). Specifically, the communication device 50 performs V2V communication (vehicle-to-vehicle communication) with another vehicle. The communication device 50 performs V2I communication (road-to-vehicle communication) with neighboring infrastructure. The communication device 50 can acquire information on an environment around the vehicle M1 using the V2X communication. The communication device 50 transmits the acquired information (hereinafter also referred to as "communication information") to the vehicle control. ECU 60.

The vehicle control ECU 60 executes autonomous driving control to control autonomous driving of the vehicle M1. Typically, the vehicle control ECU 60 is a microcomputer including a processor, a memory, and an input and output interface. The vehicle control ECU 60 receives a variety of information via the input and output interface. The vehicle control ECU 60 executes autonomous driving control based on the received information. Specifically, the vehicle control ECU 60 makes a travelling plan of the vehicle M1 and outputs information to the travelling mechanism ECU 70 such that the vehicle M1 travels in accordance with the travelling plan.

The travelling mechanism ECU 70 is a microcomputer having the same configuration as the vehicle control ECU 60. The travelling mechanism ECU 70 includes a plurality of ECUs. These ECUs control various travelling mechanisms (not illustrated) for causing the vehicle M1 to travel in accordance with information received front the vehicle control ECU 60. These travelling mechanisms are electronically controlled and include a travelling driving force output device, a steering device, and a brake device. The travelling driving force output device is a power source that generates a travelling driving force. The steering, device turns, vehicle wheels. The brake device generates a braking force.

2. Configuration of Vehicle Control ECU 60

Figure 2:
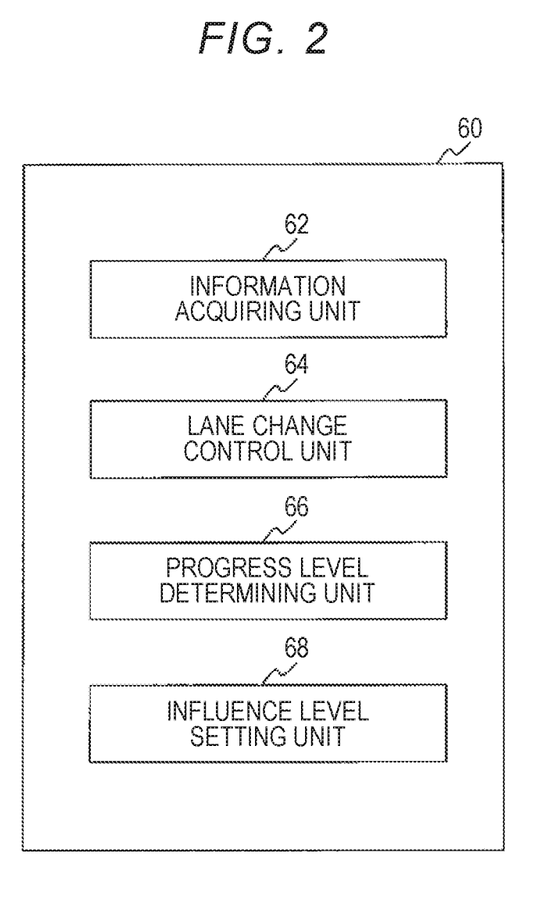
FIG. 2 is a block diagram illustrating an example of the functional configuration of a vehicle control electronic control unit illustrated in FIG. 1.

FIG. 2 is a block diagram illustrating an example of the functional configuration of the vehicle control ECU 60 illustrated in FIG. 1. In this embodiment, particularly, "lane change control" of autonomous driving control by the vehicle control ECU 60 will be considered. Lane change control is control for making a lane change for the vehicle M1 in the middle of autonomous driving of the vehicle M1. In the following description, a lane in which the vehicle M1 travels before a lane change is also referred to as a "first lane" and a lane in which the vehicle M1 travels after a lane change is also referred to as a "second lane."

The vehicle control ECU 60 includes an information acquiring unit 62, a lane change control unit 64, a progress level determining unit 66, and an influence level setting unit 68 as functional blocks associated with lane change control. These functional blocks are implemented by causing the processor of the vehicle control ECU 60 to execute a control, program stored in the memory. The control program may be stored in a computer-readable recording medium.

2.1 Information Acquiring Unit 62

The information acquiring unit 62 performs an information acquiring process. The information acquiring process is a process of acquiring driving environment information which is required for lane change control. The driving environment information is a collective name of position and orientation information, map information, external sensor information, internal sensor information, and communication information which are acquired by the information acquiring unit 62.

In the information acquiring process, the information acquiring unit 62 acquires position and orientation information.

In the information acquiring process, the information acquiring unit 62 acquires map information and generates lane information on lanes around the vehicle M1. The lane information includes arrangements (positions, shapes, and inclinations) of lanes on a map. The information acquiring unit 62 ascertains merging, branching, and crossing of lanes based on the generated lane information. The information acquiring unit 62 calculates a lane curvature, a lane width, and the like based on the generated lane information.

In the information acquiring process, the information acquiring unit 62 acquires external sensor information and generates object information on objects around the vehicle M1 Objects around the vehicle M1 include a moving object and a stationary object. Examples of a moving object include a neighboring vehicle, a motorcycle, a bicycle, and a pedestrian. Information on a moving object includes a position, a speed, and a size of the moving object. Examples of a stationary object include a road-side object, a white line, and a marker. Information on a stationary object includes a position and a size of a stationary object.

In the information acquiring process, the information acquiring unit 62 acquires internal sensor information and generates operation information on an operation member operated by a driven. Examples of an operation member include a brake pedal, an accelerator pedal, a steering wheel, and an indicator lever.

In the information acquiring process, the information acquiring unit 62 acquires communication information, Communication information is information which is delivered from infrastructure or the like. Examples of communication information include weather information, roadwork section information, accident information, and traffic regulation information.

2.2 Lane Change Control Unit 64

The lane change control unit 64 performs a lane change control process based on the driving, environment information acquired in the information acquiring process. The lane change control unit 64 performs a continuation determining process based on the driving environment information. These processes will be described below.

(1) Lane Change Control Process

The lane change control process is a process of autonomously executing lane change control. In the lane change control process, the lane change control unit 64 first determines whether lane change control is to be executed based on the driving environment information.

For example, the lane change control unit 64 recognizes branching or merging of lanes in front of the vehicle M1 based on position and orientation information and lane information. Alternatively, the lane change control unit 64 recognizes branching or merging of lanes based on external sensor information. In this case, the lane change control unit 64 determines that lane change control is to be executed, in a branching zone or a merging zone.

For example, the lane change control unit 64 recognizes an obstacle in front of the vehicle M1 based on external sensor information. Examples of an obstacle include a stopped vehicle, a low-speed travelling vehicle, and a fallen object. In this case, the lane change control unit 64 determines that lane change control is to be executed in order to avoid an obstacle.

For example, the lane change control unit 64 recognizes a roadwork section or a vehicle involved in accident in front of the vehicle M1 based on position and orientation information and received information. In this case, the lane change control unit 64 determines that lane change control is to be executed in order to avoid the roadwork section or the vehicle involved in accident.

When it is determined that lane change control is to be executed, the lane change control unit 64 calculates a lime at which execution of lane change control starts (hereinafter also referred to as a "start time").

For example, in case of branching, the lane change control unit 64 ascertains arrangements of a first lane (that is, a main lane) and a second lane (that is, a branching lane), the position of an entrance of a branching zone, and the length of a branching zone, and the like based on position and orientation information and lane information. The lane change control unit 64 ascertains conditions (a relative position, a relative speed, and the like) of a neighboring vehicle based on external sensor information and internal sensor information. Then, the lane change control unit 64 calculates the start time based on the ascertained information.

For example, when it is intended to avoid an obstacle, the lane change control unit 64 calculates a distance to the obstacle and a relative speed to the obstacle based on external sensor information and internal sensor information. The lane change control unit 64 ascertains conditions (a relative position, a relative speed, and the like) of a neighboring, vehicle based on external sensor information and internal sensor information. Then, the lane change control unit 64 calculates the start time based on the ascertained information.

When the start time has been calculated, the lane change control unit 64 determines a control value for the travelling mechanisms such that execution of lane change control starts at the start time. For example, the lane change control unit 64 sets a target steering angle and a target vehicle speed based on the start time and determines control values for the steering device and the travelling driving force output device. In the case of performing lane change control at a constant vehicle speed, the lane change control unit 64 sets a target steering angle based on the start time and determines a control value for the steering device. The lane change control unit 64 transmits the determined control value to the travelling mechanism ECU 70.

(2) Continuation Determining Process

Figure 3:
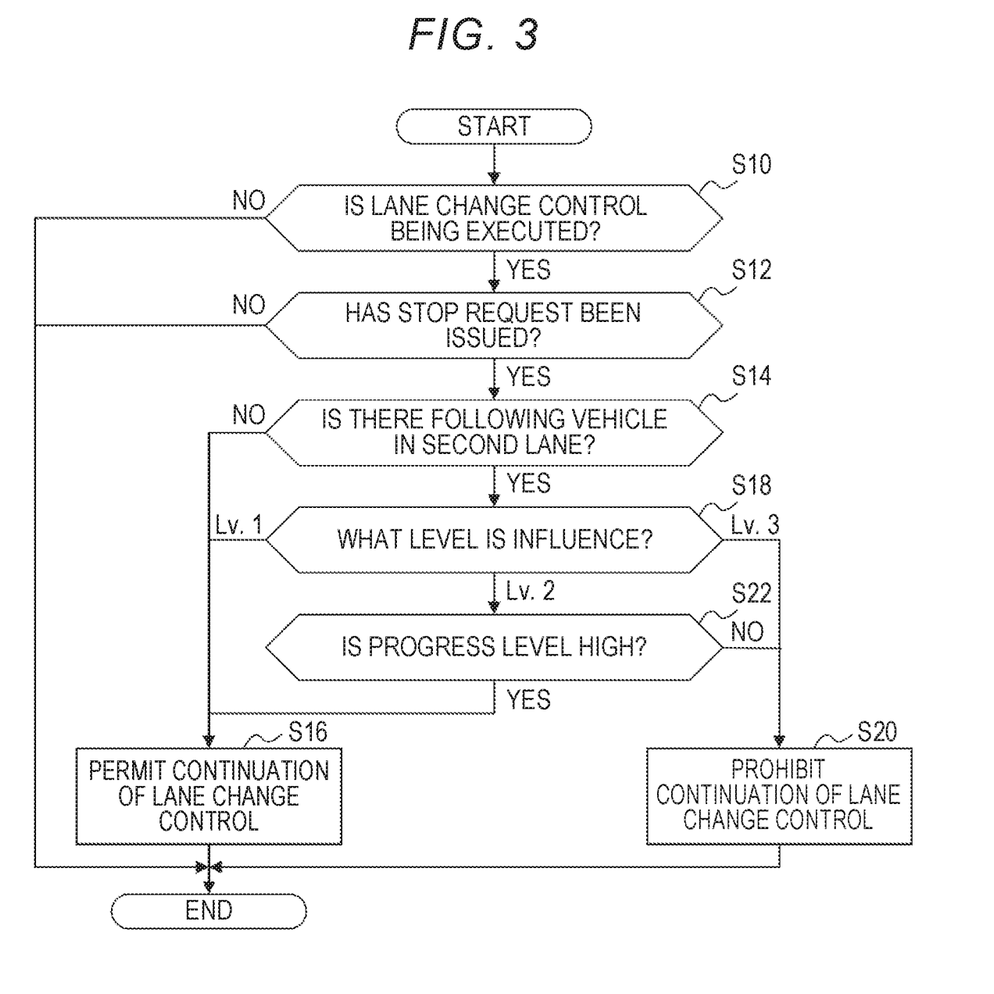
FIG. 3 is a flowchart illustrating an example of a continuation determining process.

The continuation determining process is a process of determining whether lane change control is to be continued. A main process of the continuation determining process is performed when a request for stopping execution of lane change control (hereinafter also a "stop request") is detected after the start time. When a stop request is detected before the start time, execution of lane change control is stopped at the time at winch the stop request is detected.

FIG. 3 is a flowchart illustrating an example of the continuation determining process. In the continuation determining process, it is first determined whether lane change control is being executed (step S10). The determination of step S10 is performed, for example, based on an on/off state off control execution flag. In general, the control execution flag is switched from off to on at the start time and is switched from on to off at a time at which a vehicle has reached a predetermined position in the second lane. When continuation of lane change control is prohibited (see step S16 which will be described later), the control execution flag is switched from on to off at the time at which this determination has been performed. When the determination result of step S10 is negative, the continuation determining process ends.

When the determination result of step S10 is positive, it is determined whether a stop request has been issued (step S12). The determination of step S12 is performed, for example, based on an on/off state of a stop request flag. The stop request flag is generally set to off and is switched from off to on when a stop request is being detected.

When the determination result of step S12 is positive, it is determined whether a subsequent vehicle is present in the second lane (step S14). A subsequent vehicle is a vehicle which travels behind the vehicle M1 and in the second lane. The determination of step S14 is performed based on external sensor information.

When the determination result of step S14 is negative, that is, when it is determined that a subsequent vehicle is not present in the second lane, continuation of lane change control is permitted (step S16). On the other hand, when the determination result of step S14 is positive, an influence level is determined (step S18). An influence level represents, on the assumption that lane change control is continued, a predicted degree of influence of the continuation on the subsequent vehicle. The higher the influence level is, the greater the influence is.

Although details of the influence level will be described later, the influence level has Lv. 1 to Lv. 3 in this embodiment. When it is determined in step S18 that the influence level is Lv. 1, continuation of lane change control is permitted (step S16). When it is determined that the influence level is Lv. 3, continuation of lane change control is prohibited (step S20). In this case, the lane change control unit 64 determines a control value for the travelling mechanism which is required for the vehicle M1 to run in the first lane and transmits the determined control value to the travelling mechanism ECU 70.

When it is determined in step S18 that the influence level is Lv. 2, it is determined whether a progress level is a high level (step S22). A progress level represents the progress of lane change control. The higher the progress level is, the more that lane change control progresses. Although details of the progress level will be described later, the progress level is determined to be one of Lv. 1 and Lv. 2 in this embodiment. When it is determined in step S22 that the progress level is a high level (that is, when the progress level is Lv. 2), continuation of lane change control is permitted (step S16). When it is determined that the progress level is not a high level (that is, when the progress level is Lv. 1), continuation of lane change control is prohibited (step S20).

2.3 Progress Level Determining Unit 66

The progress level determining unit 66 performs a progress level determining process. The progress level determining process is a process of determining the progress level. The progress level is calculated based on position and orientation information, external sensor information, a start time, and the like.

Figure 4:
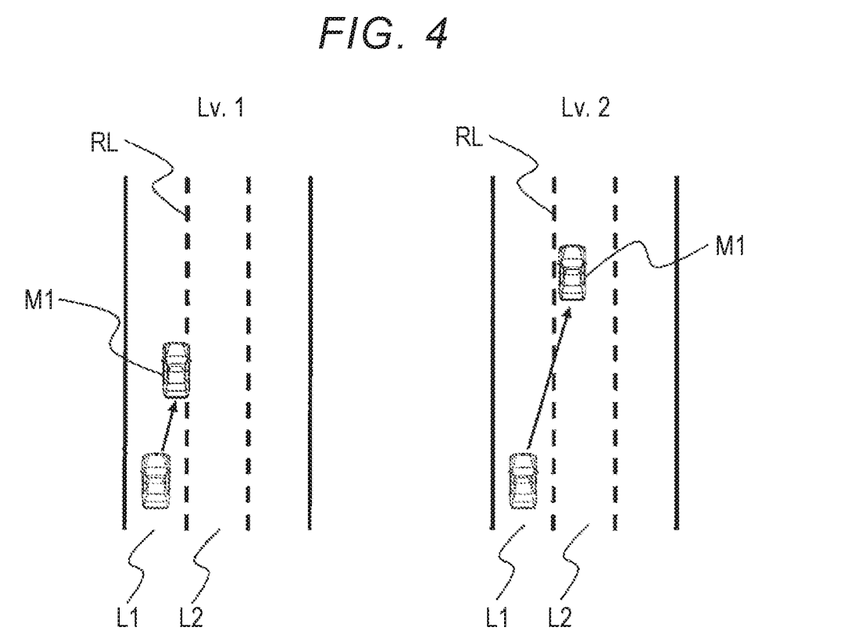
FIG. 4 is a diagram illustrating a first example of a progress level.

FIG. 4 is a diagram illustrating a first example of the progress level. In the first example, the progress level is determined based on a relative position of the vehicle M1 with respect to a reference line RL between a first lane L1 and a second lane L2. The relative position may be calculated based on position and orientation information and lane information or may be calculated based on external sensor information. The reference line RL may be a boundary line between the first lane L1 and the second lane L2 or may be a line which is set in the vicinity of the boundary line. When the relative position is in the first lane L1, it is determined that the progress level is Lv. 1 (a low level). On the other hand, when the relative position is in the second lane L2, it is determined that the progress level is Lv. 2 (a high level).

In a second example of the progress level, an elapsed time after the start time can be used. When the elapsed time is less than a threshold value, it is determined that the progress level is Lv. 1 (a low level). On the other hand, when the elapsed time is greater than the threshold value, it is determined that the progress level is Lv. 2 (a high level).

In a third example of the progress level, a travelling distance of the vehicle M1 after the start time can be used. The travelling distance is calculated by multiplying a vehicle speed by the elapsed time. When the travelling distance is less than a threshold value, it is determined that the progress level is Lv. 1 (a low level). On the other hand, when the travelling distance is greater than the threshold value, it is determined that the progress level is Lv. 2 (a high level).

2.4 Influence Level Setting Unit 68

Figure 5:
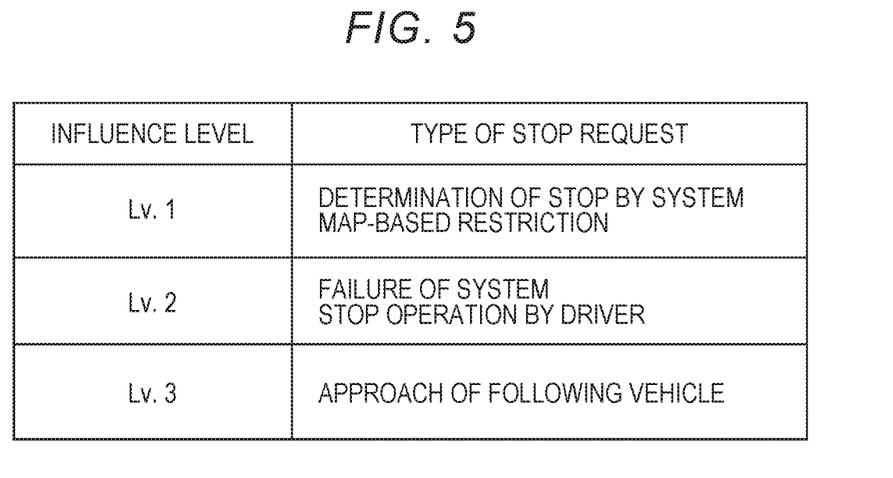
FIG. 5 is a diagram illustrating an example of the correlation between a type of a stop request and an influence level.

The influence level setting unit 68 performs an influence level setting process. The influence level setting process is a process of setting the influence level depending on a type of a stop request. The correlation between types of the stop request and the influence levels is set in advance. FIG. 5 is a diagram illustrating an example of the correlation.

As illustrated in FIG. 5, when the system determines that execution of lane change control is to be stopped, the influence level is set to Lv. 1. This determination is performed by the lane change control unit 64. When a situation in which an obstacle to be avoided is present has been resolved, the lane change control unit 64 determines that execution of lane change control is to be stopped. This situation is resolved, for example, when a low-speed vehicle in front of the vehicle M1 moves to a lane other than the first lane. This situation can also be resolved when a stopped vehicle in front of the vehicle M1 restarts travelling. When it is determined that execution of lane change control is to be stopped, a stop request is transmitted to the influence level setting unit 68.

When there is a map-based restriction, the influence level is set to Lv. 1. Whether there is a map-based restriction is determined by the lane change control unit 64. For example, when a section required for execution of lane change control is not secured, the lane change control unit 64 determines that there is a map-based restriction. When it is determined that there is a map-based restriction, a stop request is transmitted to the influence level setting unit 68.

When the system (that is, the autonomous driving system 100) fails, the influence level is set to Lv. 2. Whether the system fails is determined by the information acquiring unit 62. For example, when inputting of external sensor information is stopped, the information acquiring unit 62 determines that the system fails. When it is determined that the system fails, a stop request is transmitted to the influence level setting unit 68.

When a driver performs a stopping operation, the influence level is set to Lv. 2. Whether a driver performs a stopping operation is determined by the information acquiring unit 62. For example, when an operating direction of an indicator lever is a direction in which lane change control is stopped, the information acquiring unit 62 determines that a stopping operation has been performed. When an operating direction of the steering wheel is the stopping direction, the information acquiring unit 62 determines that a stopping operation has been performed. When it is determined that a stopping operation has been performed, a stop request is transmitted to the influence level setting unit 68.

When a subsequent vehicle approaches, the influence level is set to Lv. 3. Whether a subsequent vehicle approaches is determined by the information acquiring unit 62. For example, the information acquiring unit 62 determines whether a subsequent vehicle approaches based on the relative speed of the subsequent vehicle and an inter-vehicle distance between the vehicle M1 and the subsequent vehicle.

When it is determined that a subsequent vehicle approaches, a stop request is transmitted to the influence level setting unit 68.

3. Advantageous Effects

Figure 6:
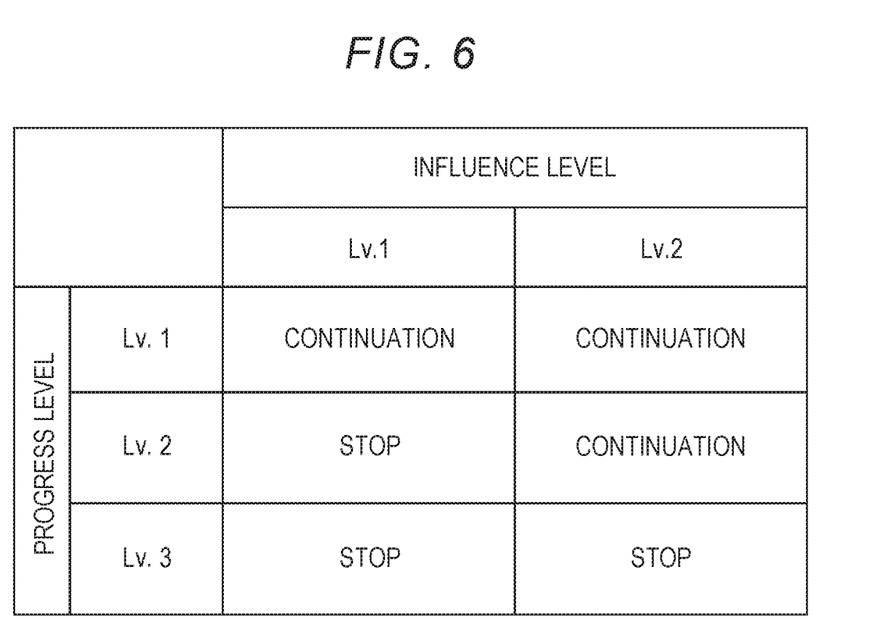
FIG. 6 is a diagram illustrating effects based on the autonomous driving system according to the embodiment of the disclosure.

With the autonomous driving system according to this embodiment, it is determined whether lane change control is to be continued based on the influence level and the progress level. FIG. 6 is a diagram illustrating effects of the autonomous driving system according to this embodiment. As illustrated in FIG. 6, according to this embodiment, lane change control is continued regardless of the progress level when the influence level is Lv. 1. When the influence level is Lv. 3, execution of lane change control is stopped regardless of the progress level. When the influence level is Lv. 2 and the progress level is Lv. 2, lane change control is continued. When the influence level is Lv. 2 and the progress level is Lv. 1, execution of lane change control is stopped.

The type of the stop request when the influence level is Lv. 1 is classified for the convenience of the vehicle M1. When the influence level is Lv. 1 and execution of lane change control is stopped halfway, a subsequent vehicle, which is unable to understand the intention of the stop, may be confused. According to the continuation determining process, lane change control is continued in this case.

The type of the stop request when the influence level is Lv. 2 is classified for the convenience of the vehicle M1. When the progress level is Lv. 2, it means that a half or more of lane change control is ended. Accordingly, when lane change control is forcibly stopped in response to the stop request, a subsequent vehicle may be confused. According to the continuation determining process, lane change control is continued in this case.

In addition, the type of the stop request when the influence level is Lv. 2 is classified for safe execution of lane change control. For example, when it is determined that the system fails in the initial stage of lane change control, lane change control may not end safely. Since, the stopping operation is based on a driver's intention, it is not preferable that a stopping operation in the initial state of lane change control be continuously ignored in view of safe ending of lane change control. When lane change control cannot end safely, a subsequent vehicle may be confused. According to the continuation determining process, execution of lane change control is stopped in this case.

The type of the stop request when the influence level is Lv. 3 is classified for safe execution of lane change control. When the influence level is Lv. 3 and lane change control is forcibly continued, a subsequent vehicle, which is forced to travel on the assumption of collision with the vehicle M1, may be confused. According to the continuation determining process, execution of lane change control is stopped in this case.

With the autonomous driving system according to this embodiment, it is possible to execute lane change control in consideration of a subsequent vehicle (or a driver thereof).

4. Correspondence Between Embodiment and Disclosure

In the above-mentioned embodiment, the GPS receiver 10, the map database 20, the external sensor 30, the internal sensor 40, and the communication device 50 correspond to an example of an "information acquiring device" in the disclosure. The vehicle control ECU 60 and the travelling mechanism ECU 70 correspond to an example of a "travelling control device" in the disclosure. In the above-mentioned embodiment, the influence level Lv. 1 corresponds to a "low level" in the disclosure, the influence level Lv. 2 corresponds to a "medium level" in the disclosure, and the influence level LV. 3 corresponds to a "high level" in the disclosure.

Autonomous driving which is controlled by this system is not limited to the above-mentioned embodiment and may be any one of levels 2 to 5 of autonomous driving. Autonomous driving of level 2 corresponds to partial autonomous driving in which the system simultaneously performs a plurality of operations among acceleration, steering, and braking while observing the driving environment. Autonomous driving of level 3 corresponds to conditional autonomous driving in which the system performs acceleration, steering, and braking only under a restrictive environment or traffic conditions and a driver performs the operations when being requested by the system. Autonomous driving of level 4 corresponds to advanced autonomous driving in which the system performs all the operations of acceleration, steering, and braking only under specific conditions such as an expressway and a driver is not involved at all as long as the conditions are kept. Autonomous driving of level 5 corresponds to complete autonomous driving in which the system takes charge of driving under all the possible situations and extreme environments.

What is claimed is:

1. An autonomous driving system which is mounted in a vehicle, the autonomous driving system configured to:
   acquire driving environment information indicating a driving environment of the vehicle;
   execute, based on the driving environment information, lane change control from a first lane to a second lane during autonomous driving; and
   perform a continuation determining process of determining whether to continue the lane change control based on a combination of a progress level and an influence level when a subsequent vehicle in the second lane is detected based on the driving environment information and a stop request for execution of the lane change control is detected after execution of the lane change control has started, wherein
   the progress level represents progress of the lane change control,
   the influence level represents a degree of influence of continuing the lane change control on the subsequent vehicle, and
   the influence level is set in advance depending on a type of the stop request, and
   wherein:
   the autonomous driving system is configured to perform a progress level determining process of determining the progress level in the continuation determining process;
   in the progress level determining process, the autonomous driving system is configured to
      determine that the progress level is a first progress level when a relative position of the vehicle with respect to a reference line between the first lane and the second lane is on the first lane side, and
      determine that the progress level is a second progress level when the relative position is on the second lane side; and
   in the continuation determining process, the autonomous driving system is configured to
      determine not to continue the lane change control regardless of the progress level when the influence level is a third influence level, determine to continue the lane change control regardless of the progress level when the influence level is a first influence level, determine not to continue the lane change control when the influence level is a second influence level and it is determined that the progress level is the first progress level, and determine to continue the lane change control when the influence level is the second influence level and it is determined that the progress level is the second progress level, the first influence level being lower than the second influence level, and the second influence level being lower than the third influence level.

2. The autonomous driving system according to claim 1, wherein:

in the progress level determining process, the autonomous driving system is configured to determine that the progress level is the first progress level when an elapsed time after execution of the lane change control has started is less than a threshold value, and determine that the progress level is the second progress level when the elapsed time is greater than the threshold value.

3. The autonomous driving system according to claim 1, wherein in the progress level determining process, the autonomous driving system is configured to determine that the progress level is the first progress level when a travelling distance of the vehicle after execution of the lane change control has started is less than a threshold value, and determine that the progress level is the second progress level when the travelling distance is greater than the threshold value.

4. The autonomous driving system according to claim 1, wherein in the progress level determining process, the autonomous driving system is configured to determine that the progress level is the first progress level when a relative position of the vehicle with respect to a reference line between the first lane and the second lane is on the first lane side, and determine that the progress level is the second progress level when the relative position is on the second lane side; and in the continuation determining process, the autonomous driving system is configured to determine whether to continue the lane change control based on the progress level when the influence level is the first influence level, and determine whether to continue the lane change control based on the influence level when the influence level is the second influence level.

5. An autonomous driving system which is mounted in a vehicle, the autonomous driving system configured to:

acquire driving environment information indicating a driving environment of the vehicle;

execute, based on the driving environment information, lane change control from a first lane to a second lane during autonomous driving; and perform a continuation determining process of determining whether to continue the lane change control based on a combination of a progress level and an influence level when a subsequent vehicle in the second lane is detected based on the driving environment information and a stop request for execution of the lane change control is detected after execution of the lane change control has started, wherein the progress level represents progress of the lane change control, the influence level represents a degree of influence of continuing the lane change control on the subsequent vehicle, the influence level is set in advance depending on a type of the stop request, and the influence level includes a first influence level and a second influence level, and a degree of influence on the subsequent vehicle at the second influence level is higher than that at the first influence level.

* * * * *